(12) United States Patent
Ghosh

(10) Patent No.: US 9,118,482 B2
(45) Date of Patent: Aug. 25, 2015

(54) FAULT TOLERANT APPARATUS AND METHOD FOR ELLIPTIC CURVE CRYPTOGRAPHY

(71) Applicant: Intel Corporation, Santa Clara, CA (US)

(72) Inventor: Santosh Ghosh, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 14/039,997

(22) Filed: Sep. 27, 2013

(65) Prior Publication Data

US 2015/0092941 A1 Apr. 2, 2015

(51) Int. Cl.
*H04L 9/30* (2006.01)
*G06F 12/14* (2006.01)

(52) U.S. Cl.
CPC .......... *H04L 9/3066* (2013.01); *G06F 12/1408* (2013.01)

(58) Field of Classification Search
CPC ......... H04L 9/003; H04L 9/004; H04L 9/002; H04L 9/3073; H04L 9/3234; H04L 9/3218; H04L 9/3255; H04L 2209/42; H04L 9/005; H04L 9/3066; H04L 9/0894; H04L 2209/08; H04L 63/0428; H04L 63/062; H04L 9/0625; H04L 2209/12; H04L 63/0853; G06F 2207/7219; G06F 7/725; G06F 2207/7228

USPC .............................................. 380/30; 726/22
See application file for complete search history.

(56) References Cited

U.S. PATENT DOCUMENTS

| 2004/0015725 A1* | 1/2004 | Boneh et al. ................... 713/201 |
| 2005/0138426 A1* | 6/2005 | Styslinger ...................... 713/201 |
| 2011/0170692 A1* | 7/2011 | Konrad et al. ................. 380/260 |

OTHER PUBLICATIONS

Joye et al., The Montgomery Powering Ladder, Springer, 2003.*
Karaklajic et al., A Systematic M Safe-error Detection in Hardware Implementations of Cryptographic Algorithms, IEEE, 2012.*
Ghosh et al., Parallel crypto-devices for GF(p) elliptic curve multiplication resistant against side channel attacks, Elsevier, 2008.*
Santosh Ghosh, santosh_phd_thesis, Jul. 2011.*

* cited by examiner

*Primary Examiner* — Michael Chao
*Assistant Examiner* — Shu Chun Gao
(74) *Attorney, Agent, or Firm* — Nicholson De Vos Webster & Elliott LLP

(57) ABSTRACT

A fault tolerant apparatus and method for elliptic curve cryptography. For example, one embodiment of a processor includes one or more cores to execute instructions and process data; and fault attack logic to ensure that the execution of the instructions and processing of the data is not vulnerable to memory safe-error attacks after a fault is injected by hiding any correlation between processor behavior and secret bits in a secret key.

15 Claims, 11 Drawing Sheets

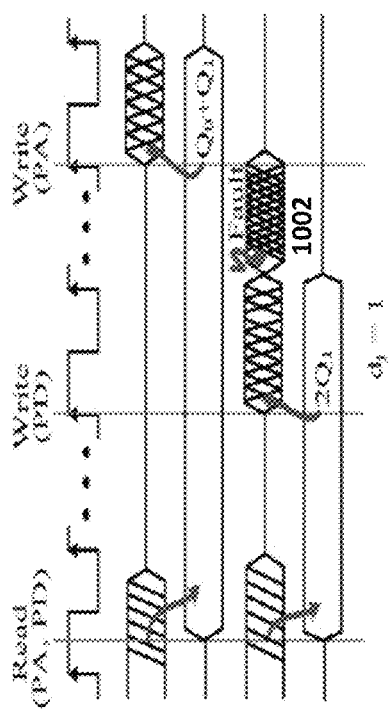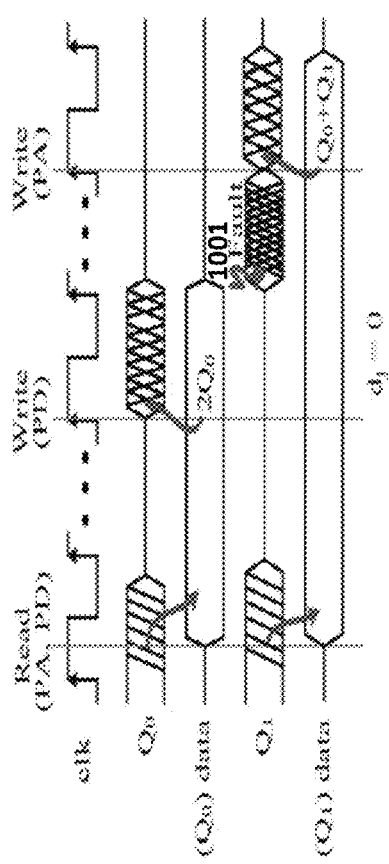
FIG. 10

FAULT TOLERANT APPARATUS AND METHOD FOR ELLIPTIC CURVE CRYPTOGRAPHY

BACKGROUND

1. Field of the Invention

This invention relates generally to the field of computer processors. More particularly, the invention relates to a fault tolerant apparatus and method for elliptic curve cryptography.

2. Description of the Related Art

Invasive attacks based on fault injection are one of the major threats in industrial cryptography. An adversary performs the fault attacks on a cryptographic implementation by injecting faults at some specific circuit elements. It could either be a memory element (M safe-error) or a computational data-path (C safe-error). The injected fault/error could be safe or unsafe which means it could make the final output fault free or faulty, respectively. This circuit behavior with the injected fault is exploited to find out the secret key bits of the underlying cryptographic protocol.

Prior art techniques exist for protecting the elliptic curve against side-channel attacks. In particular, current techniques exist for protecting RSA and elliptic curve schemes against side-channel attacks and C safe-error based fault attacks. While deterministic mechanisms to identify the existence of M safe-error vulnerability to a circuit in RTL form have been proposed, there is no existing solution to protect elliptic curve implementations against M safe-error based fault attacks. Thus, additional techniques are needed to protect elliptic curve-based public key infrastructures against M safe-error attacks.

BRIEF DESCRIPTION OF THE DRAWINGS

A better understanding of the present invention can be obtained from the following detailed description in conjunction with the following drawings, in which:

FIG. 10 illustrates read and write timings associated with injected faults with parallel execution of point additions and point doublings.

DETAILED DESCRIPTION

In the following description, for the purposes of explanation, numerous specific details are set forth in order to provide a thorough understanding of the embodiments described below. It will be apparent, however, to one skilled in the art that the embodiments may be practiced without some of these specific details. In other instances, well-known structures and devices are shown in block diagram form to avoid obscuring the underlying principles of the embodiments.

Exemplary Processor Architectures and Data Types

Figure 1:
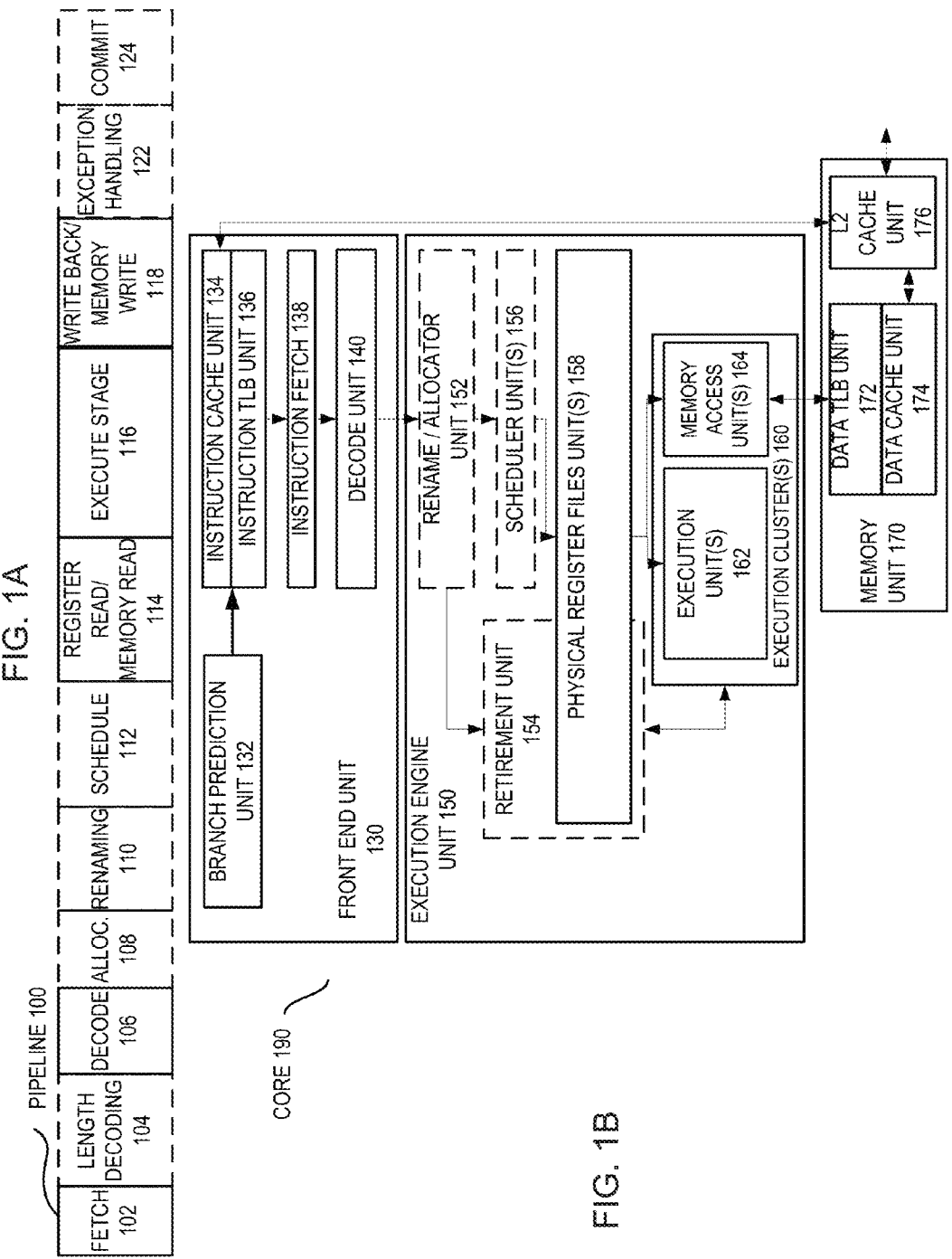
FIG. 1A is a block diagram illustrating both an exemplary in-order pipeline and an exemplary register renaming, out-of-order issue/execution pipeline according to embodiments.
FIG. 1B is a block diagram illustrating both an exemplary embodiment of an in-order architecture core and an exemplary register renaming, out-of-order issue/execution architecture core to be included in a processor according to embodiments.

FIG. 1A is a block diagram illustrating both an exemplary in-order pipeline and an exemplary register renaming, out-of-order issue/execution pipeline according to embodiments. FIG. 1B is a block diagram illustrating both an exemplary embodiment of an in-order architecture core and an exemplary register renaming, out-of-order issue/execution architecture core to be included in a processor according to embodiments. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
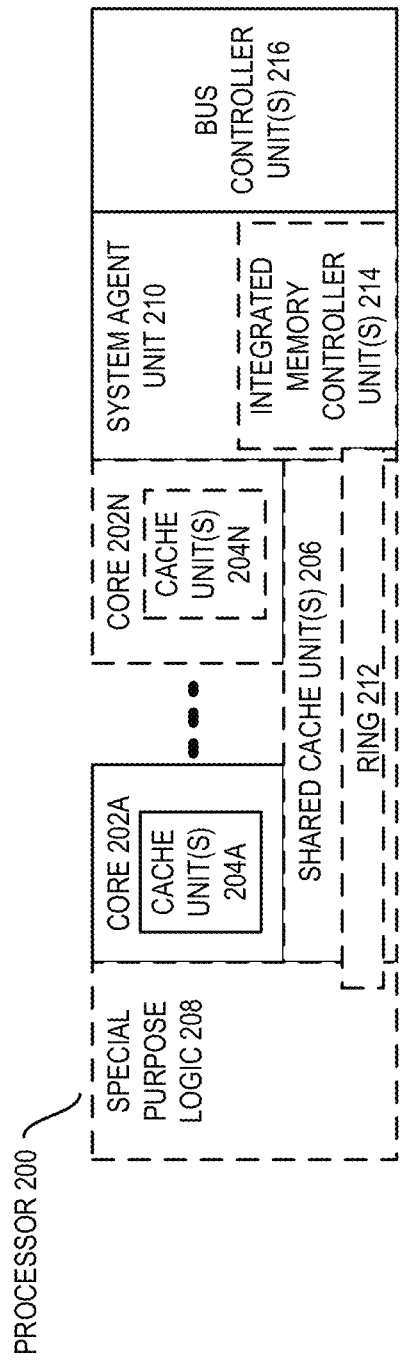
FIG. 2 is a block diagram of a single core processor and a multicore processor with integrated memory controller and graphics according to embodiments.

FIG. 2 is a block diagram of a processor 200 that may have more than one core, may have an integrated memory controller, and may have integrated graphics according to embodiments. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
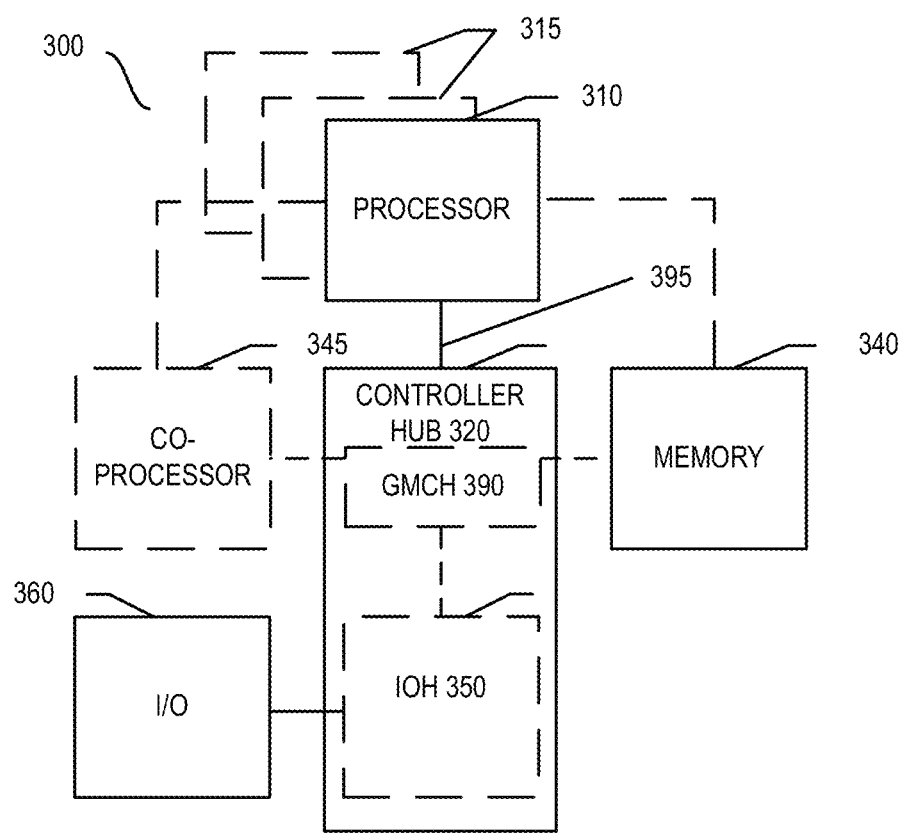
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
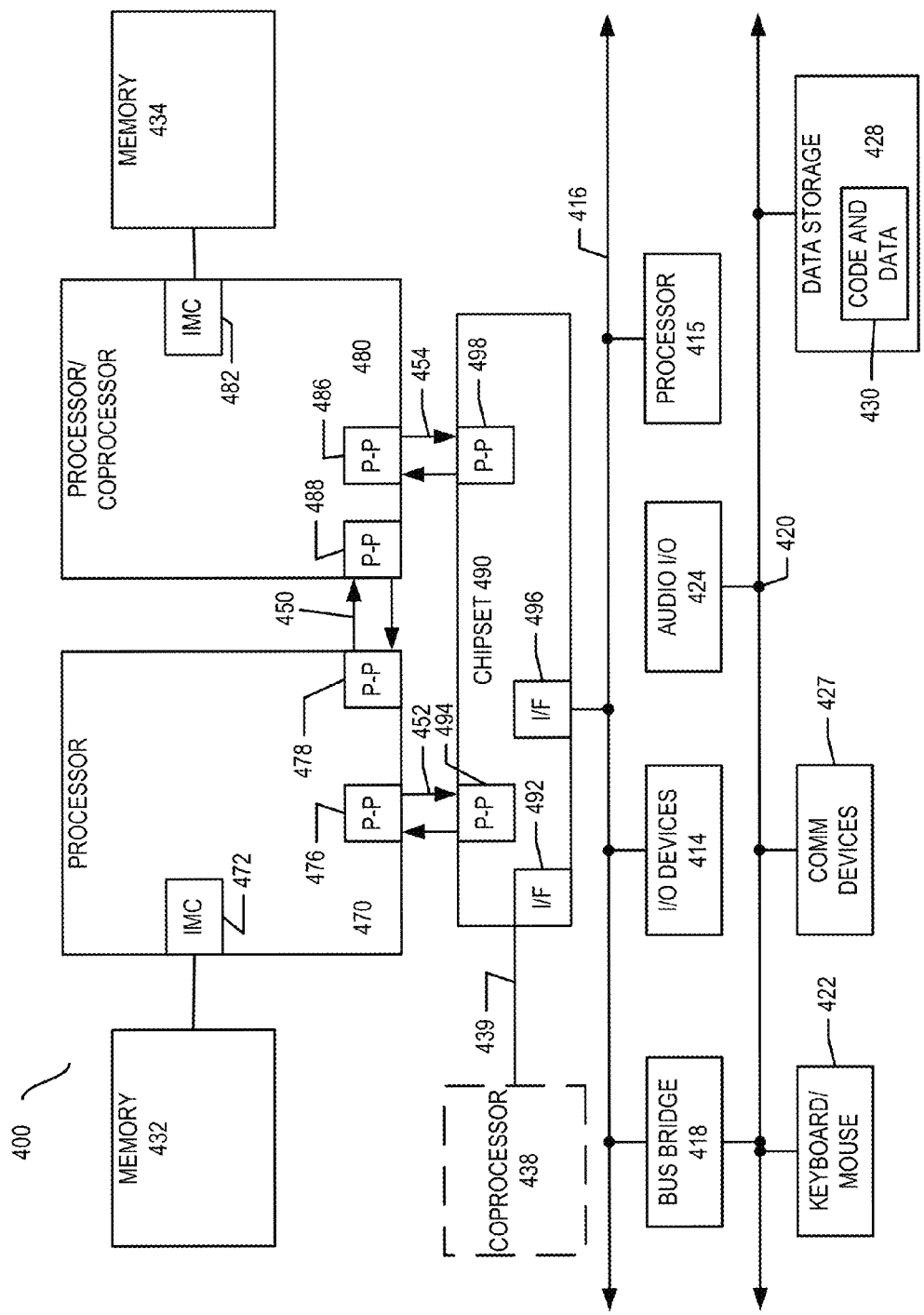
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
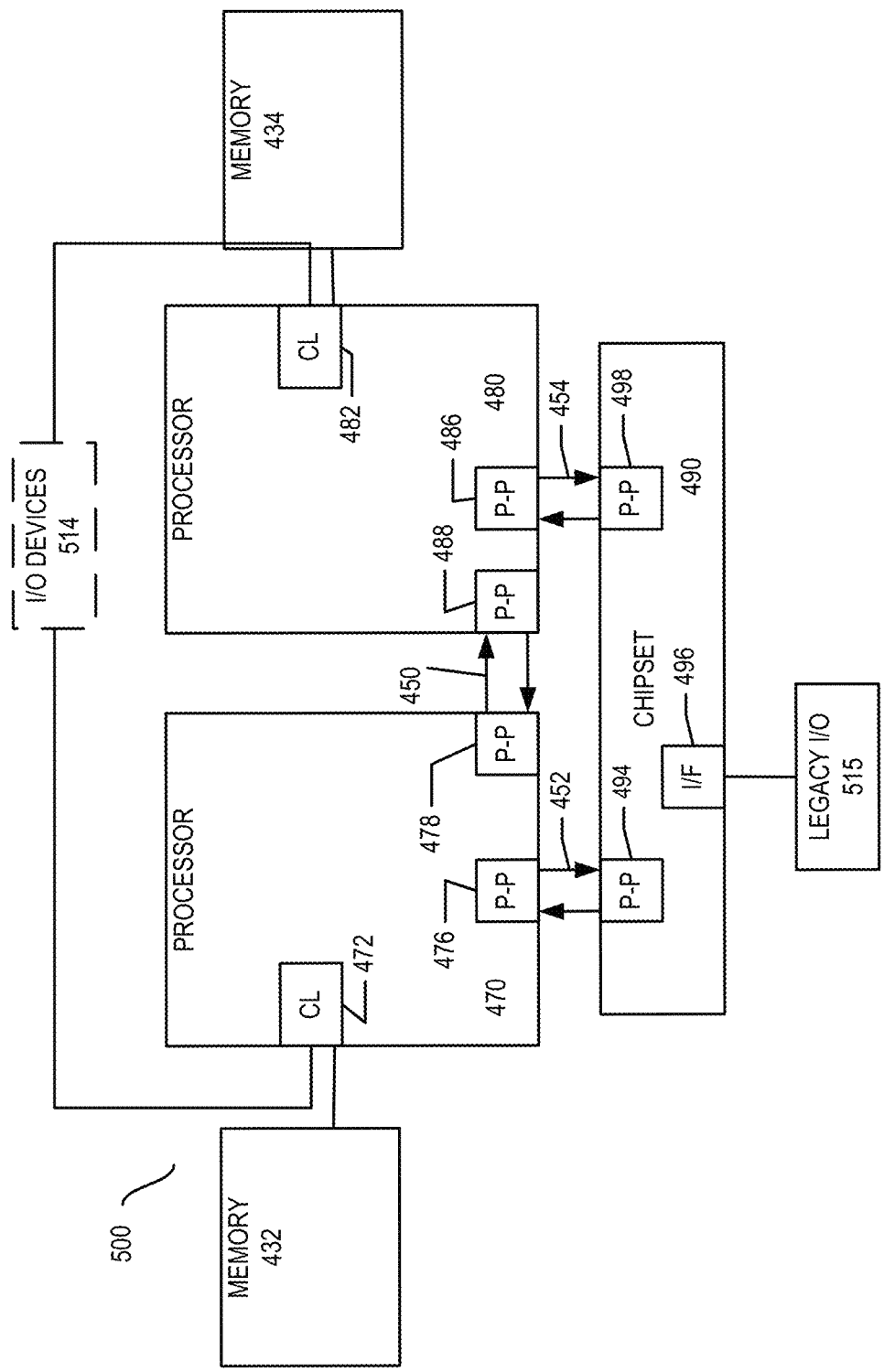
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
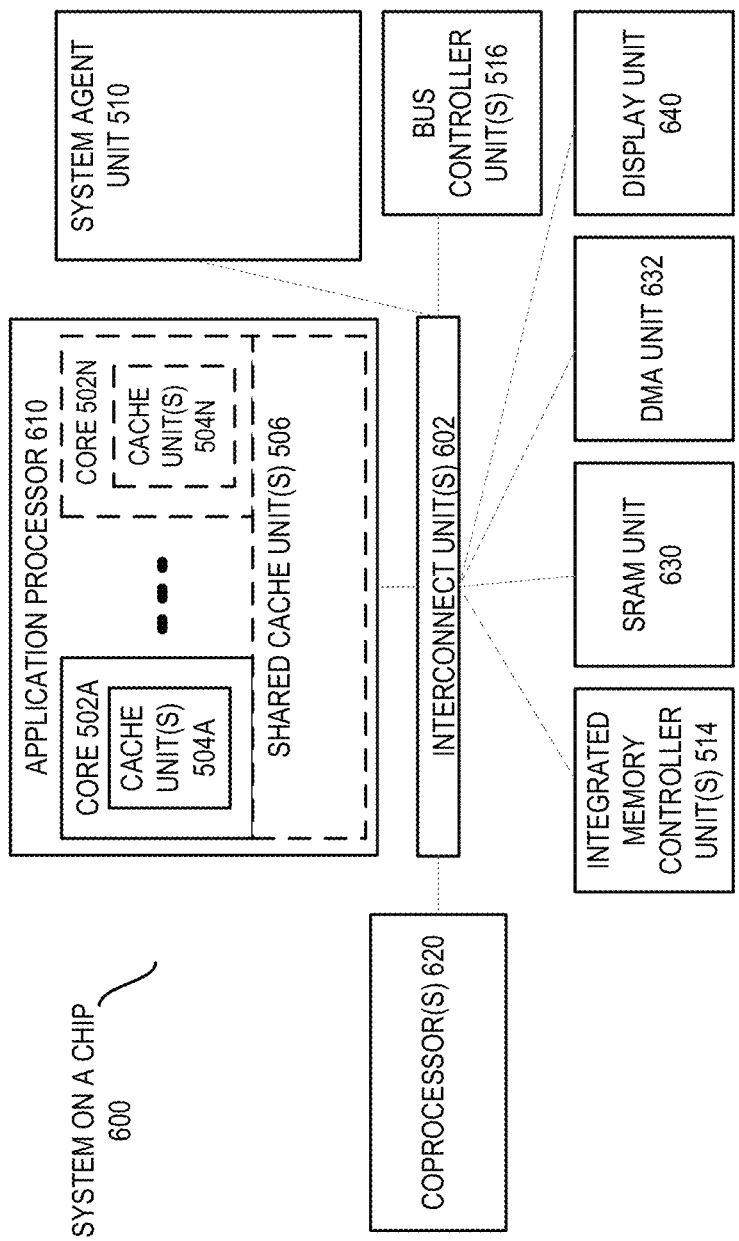
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
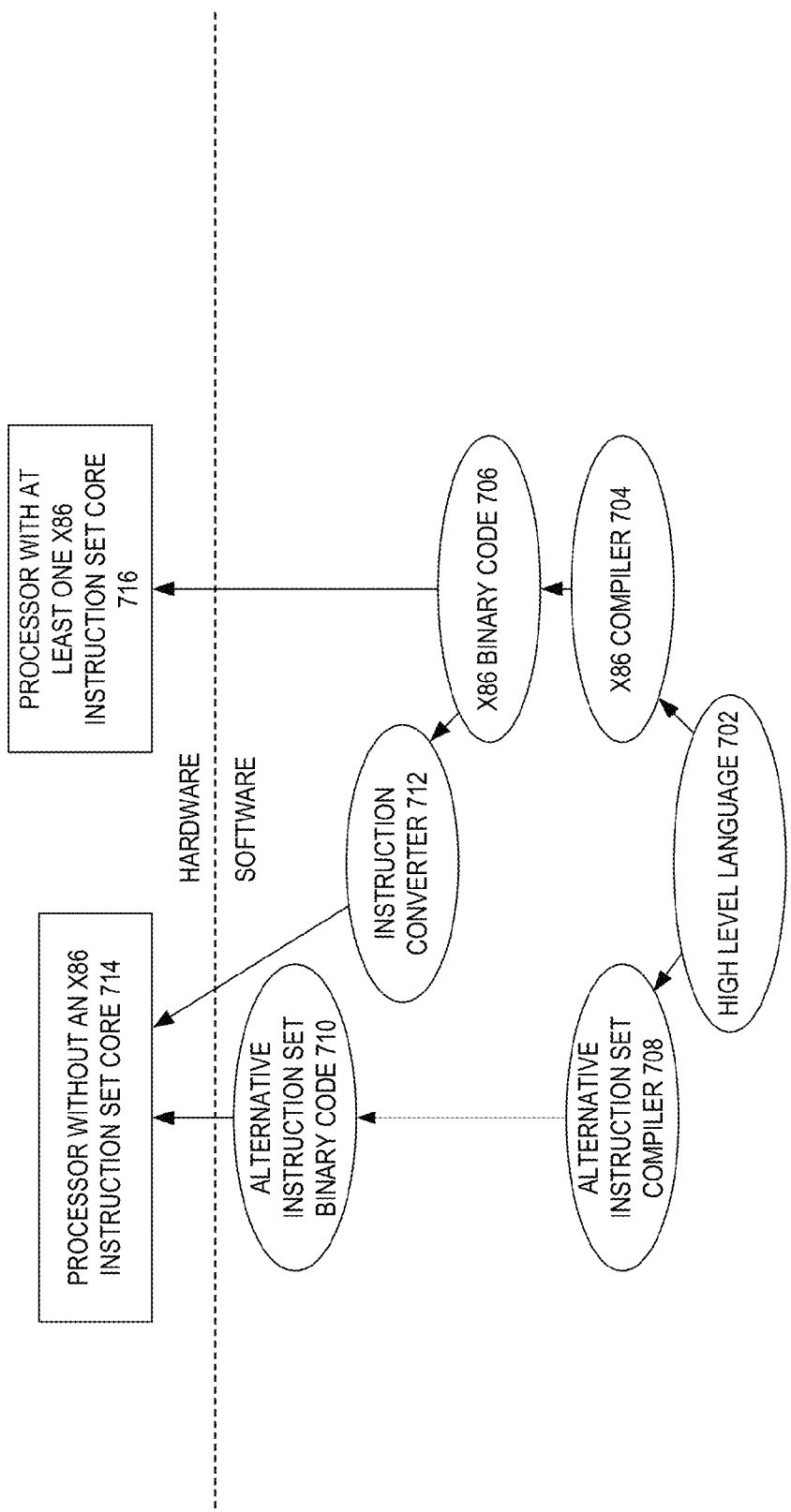
FIG. 7 illustrates a block diagram contrasting the use of a software instruction converter to convert binary instructions in a source instruction set to binary instructions in a target instruction set according to embodiments.

FIG. 7 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Fault Tolerant Apparatus and Method for Elliptic Curve Cryptography

As mentioned above, the altered circuit behavior after injecting a fault is directly correlated to the secret bits in public key implementations. This characteristic is exploited to determine the secret bits in a fault attack. The embodiments described herein provide techniques to hide the above correlation, thereby protecting the elliptic curve implementation against fault attacks. These embodiments include an algorithm and architecture for elliptic curve cryptography that respond uniformly to an injected fault irrespective of the secret bits. That is, there is no correlation between the injected fault and the output.

Elliptic curve scalar multiplication (ECSM) is a one-way function which is used to develop all elliptic curve cryptographic schemes. It is defined as: $Q,=[d]P$, where Q,P are two points on a suitable elliptic curve and d is an integer. The computation of [d]P on given d and P is easy; but the reverse operations, i.e., given Q and P it is difficult to find d such that $Q,=[d]P$. In elliptic curve schemes the integer d is used as a secret key. Therefore, [d]P is a very sensitive operation which should be executed with care so that no information be leaked to mount an attack for guessing the integer d. There are several algorithms to compute [d]P targeting to protect secret d against different physical (sidechannel and fault) attacks. The Montgomery Powering Ladder is one of the best known solutions to protect ECSM against simple side-channels and C safe-error attacks which is depicted in Algorithm 1 in Table A below.

TABLE A

Algorithm 1: Montgomery ladder for elliptic curves.

Input: P, d = (1, $d_{n-2}$, ..., $d_0$)$_2$
Output: Q = dP.
1.  $Q_0 \leftarrow P; Q_1 \leftarrow 2P$;
2.  for j = n − 2 downto 0 do
3.  $\quad Q_{-dj} \leftarrow Q_0 + Q_1; Q_{dj} \leftarrow 2Q_{dj}$
4.  return $Q_0$;

In the above algorithm, d is an n-bit integer with a most significant bit always equal to 1. According to the notation in Table A, $-d_j$ refers to the opposite binary value of $d_j$. Thus, if $d_j=1$, then $-d_j=0$ and if $d_j=0$, then $-d_j=1$. This same notation is used throughout the remainder of this patent application.

In operation 1, $Q_0$ and $Q_1$ are initialized to P and 2P respectively. The for loop is performed n−1 times. If $d_j$ (the current bit being read from the binary value d) is 0, then $Q_1$ is set equal to $Q_0+Q_1$ and $Q_0$ is set equal to $2Q_0$. If is 1, then $Q_0$ is set equal to $Q_0+Q_1$ and $Q_1$ is set equal to $2Q_1$. Thus, this algorithm computes a point addition ($Q_0+Q_1$) and a point doubling ($2Q_{dj}$ in each iteration independently on the secret bit $d_j$. Thus it is protected against timing, simple power and simple EM attacks. The algorithm is also secure against C safe-error based fault attack as there is no dummy operation. All intermediate point addition and point doubling operations are used to generate the final result.

As mentioned, an M safe-error is another type of fault attack where the error/fault is injected in memory elements or registers at a specific time. Based on the secret bit, the error is cleared or sustained which is observed through the final result. Techniques such as curve integrity checks and the Montgomery indeterminant check are sometimes used against these fault attacks. The device stops execution with zero result if any of these checks fail.

However, because the execution is changed based on the injected M safe-error/fault, the related secret bit may be guessed even in presence of these checks. There is currently no suitable solution to prevent M safe-error attacks on an elliptic curve implementation.

The embodiments address this problem and provide a solution that protects an elliptic curve scheme against M safe-error attacks. The point addition and point doubling operations in Step-3 of Table A may be executed in serial or in parallel based on the available processing resources. The embodiments process them separately with two different architecture models—serial execution, and parallel execution—each of which is described below.

Figure 8:
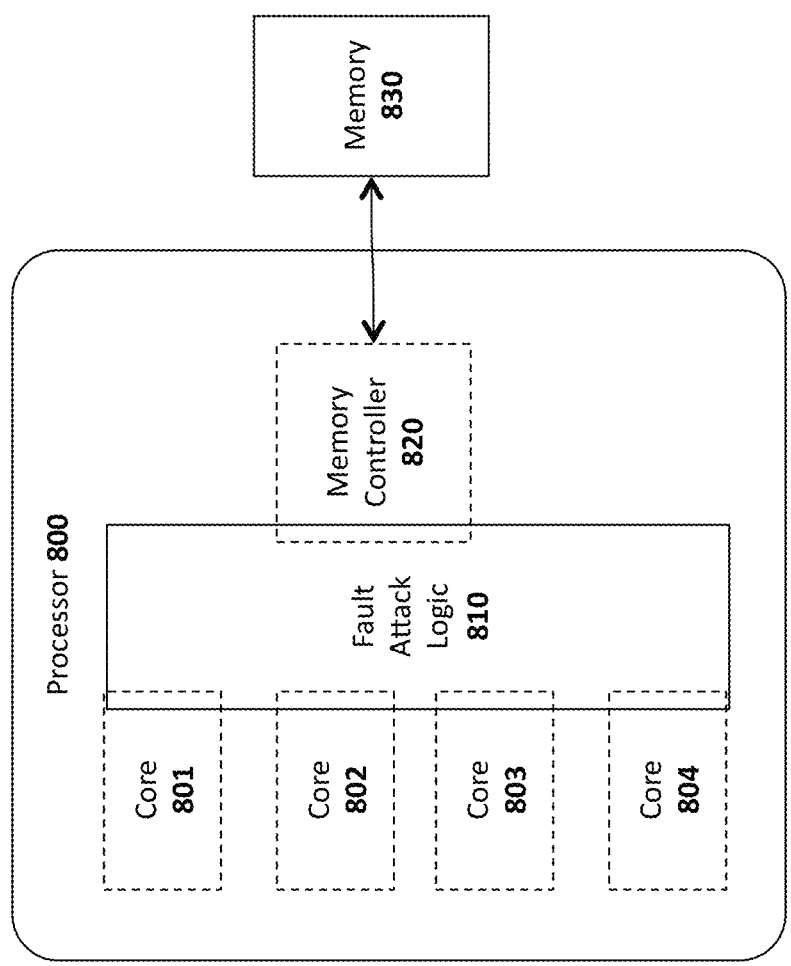
FIG. 8 illustrates one embodiment of a processor architecture on which embodiments may be implemented.

As illustrated generally in FIG. 8, the embodiments of may be implemented as fault attack logic 810 within a processor 800. The fault attack logic 810 may be implemented individually within each processor core 801-804 (in a multi-core processor 800) or may be implemented within the memory controller 820 which couples the processor to memory 830 (e.g., such as a RAM or other memory device). The memory controller 820 in one embodiment forms part of a larger memory subsystem which includes the memory controller 820 and the various levels of a cache hierarchy including caches on each of the cores 801-804 (e.g., level 1 (L1), level 2 (L2) caches) and caches external to the cores (e.g., a level 3 (L3) cache). The fault attack logic 810 may be executed in software (e.g., using instructions executable by the processor to perform the operations described herein), hardware (e.g., using dedicated circuitry to perform the operations described herein), or any combination thereof (e.g., using instructions in combination with dedicated processor circuitry). The underlying principles are not limited to any particular implementation.

A. Serial Execution of Point Addition (PA) and Point Doubling (PD)

Figure 9:
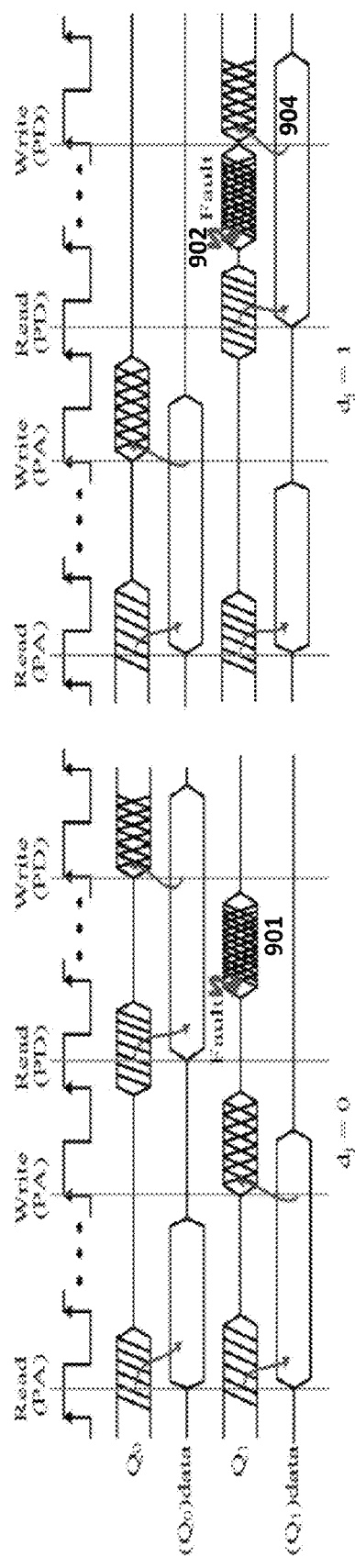
FIG. 9 illustrates read and write timings associated with injected faults with serial execution of point additions and point doublings.

An illustration as to how execution may be vulnerable to M safe-error attacks is provided in FIG. 9. In this example, two iterations are shown, one for dj=0 (on the left) and one for $d_j$=1 (on the right). The adversary injects a fault at 901 and 902 into the $Q_1$ register after reading the value of the $Q_{dj}$ register for the execution of $2Q_{dj}$. Now, if $d_j$=1 then the fault 902 is safe as it is cleared by the new result of $2Q_1$ at 904 (i.e., where the results of the point doubling operation are written to register $Q_1$ after the fault). However, if $d_j$=0 then the fault 901 is unsafe as it is not cleared by a new result for the $Q_1$ register (i.e., it alters the final result of the [d]P operation). Therefore, the serial execution is vulnerable against M safe-error attacks without any special protection during execution.

In one embodiment, the fault attack logic 810 executes the series of operations set forth in Table B below to provide an M safe-error attack resistant serial execution. Execution of $2Q_{dj}$ is done first and its result is stored in a temporary register R (operation 3). Then the execution of $Q_0+Q_1$ is scheduled. Once this computation is completed and its result is available at the output buffer T of the serial architecture (operation 4), the results of both and operations are written back into the respective Q registers concurrently (e.g., at the same clock edge) in operation 5. Performing this series of operations ensures that the effects of injected errors at any registers at any time are independent of the secret bits.

TABLE B

Algorithm 2: M safe-error resistant serial execution.

Input: P, d = (1, $d_{n-2}$, ..., $d_0$)$_2$
Output: Q = dP.
1.  $Q_0$ ← P; $Q_1$ ← 2P;
2.  for j = n − 2 downto 0 do
3.   R ← $2Q_{dj}$;
4.   T ← $Q_0$ + $Q_1$
5.   $Q_{\neg dj}$ ← T; $Q_{dj}$ ← R
6.  end for;
7.  return $Q_0$;

Various types of error injection scenarios will now be described and evaluated with respect to the above series of operations.
1. Fault at the beginning of an iteration j: Let us consider the adversary injects a fault at the $Q_1$ (or $Q_0$) register just before starting iteration for $d_j$ but after completion of the previous iteration. Due to this fault, result of $Q_0+Q_1$ will be faulty and it will alter the final result irrespective of $d_j$.
2. Faults after the execution of operation 3 ($2Q_{dj}$): None of the errors at $Q_1$ or $Q_0$ registers at this time is a safe-error as data from both $Q_0$ and $Q_1$ are used in the $Q_0+Q_1$ operation after injecting the fault. Thus, irrespective of $d_j$, the faulty result of the PA operation will alter the final result.
3. Faults after starting the execution of $Q_0+Q_1$: Both registers $Q_0$ and $Q_1$ are updated in operation 5 with fault-free new results available at the R and T registers. Thus, these faults become safe-errors in any case and are cleared out irrespective of $d_j$. The final result will be fault free.
4. Faults at R and T registers: Irrespective of secret $d_j$, these two registers are used to hold the results of PD and PA operations, respectively. Therefore, the fault of these registers alters the final result independently of the secret bits.

B. Parallel Execution of Point Addition (PA) and Point Doubling (PD)

Two identical processing cores may be used to execute PA and PD in parallel. The formulas for calculating PA and PD are different and they require unequal times on the same processing unit. FIG. 10 demonstrates the vulnerability of the parallel unbalanced execution of PA and PD against M safe-error attacks. In particular, for $d_j$=0 (illustrated on the left) the fault 1001 is injected into register $Q_1$ prior to writing the results of the PA operation ($Q_0+Q_1$). Thus, the fault will be cleared out by the writing of the $Q_0+Q_1$ operation.

However, for $d_j$=1 (illustrated on the right), the fault 1002 is written after the results of $2Q_1$ are written to the $Q_1$ register. Thus, the fault is not cleared by a new result for the $Q_1$ register and alters the final result of the [d]P operation. Consequently, this parallel execution is vulnerable against M safe-error attacks without any special protection during execution.

Figure 11:
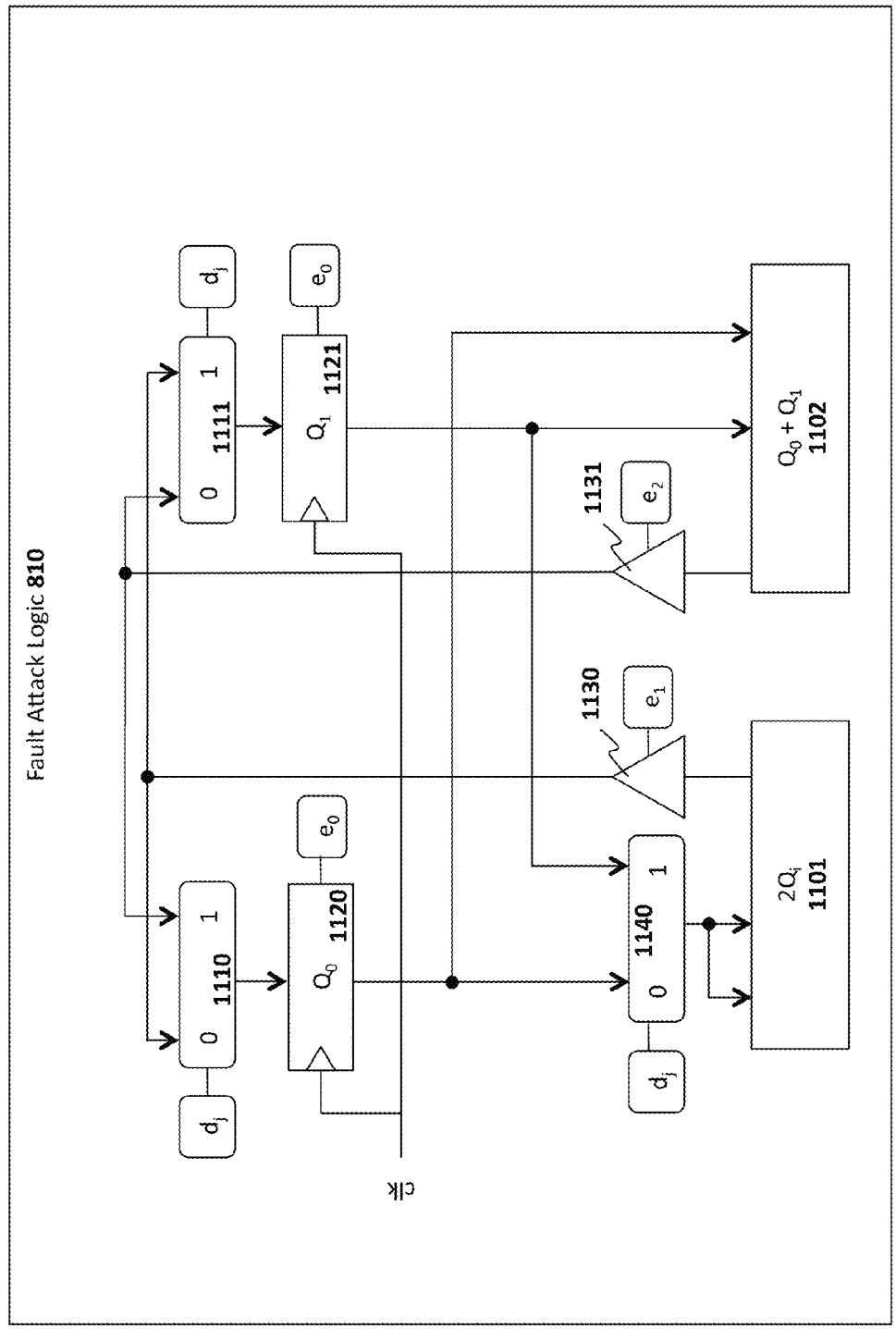
FIG. 11 illustrates an apparatus for ensuring that a processor is not vulnerable to memory (M)-safe error attacks using a parallel architecture.

One embodiment of architecture for addressing these limitations and protecting parallel PA and PD operations against M safe-error attacks is shown in FIG. 11. This architecture starts the execution of $Q_0+Q_1$ and $2Q_i$ at the same time, which means data is concurrently read from the $Q_0$ register 1120 and the $Q_1$ register 1121 (e.g., at the same clock edge). In FIG. 11, selector 1140 which is a 2:1 MUX controlled by the value of $d_i$. Thus, the PD operation 1101 will be $2Q_1$ if $d_i$=1 and $2Q_0$ if $d_i$=0.

Output buffers 1130 and 1131 of the respective cores or processing units store the same data throughout the execution of PA and PD operations. They temporarily buffer the results of new PD and PA, whichever completes first, at the same time. The output buffers 1130 and 1131 perform register-write operations for updating both the $Q_0$ register 1120 and $Q_1$ register 1121, respectively. The registers 1120, 1121 are restored at the same clock edge in response to a common enable signal $e_0$ (which enables writing of the new values). Selectors 1110 and 1111 are 2:1 MUXes controlled by the value of $d_i$. Thus, the value written into the $Q_0$ register is $2Q_0$ if $d_i$=0 and $Q_0+Q_1$ if $d_i$=1. Similarly, the value written into the $Q_1$ register is $2Q_1$ if $d_i$=1 and $Q_0+Q_1$ if $d_i$=0.

Using this embodiment, any fault injected between data-read and register-write operations will always be cleared out (safe). Similarly, the fault after a register-write operation will always be carried through to the next iterations (unsafe), which may also be inferred as fault injection before data-read at the next iteration. This ensures the security of the illustrated embodiment against M safe-error attacks.

The embodiments described herein may be used inside any products that consist of public key cryptographic (PKC) schemes used for functions such as encryption, authentication, signature generation, etc, and may be used to protect against physical attacks.

Embodiments may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
one or more cores to execute instructions and process data; and
fault attack logic to ensure that the execution of the instructions and processing of the data is not vulnerable to memory safe-error attacks by hiding any correlation between processor behavior and secret bits in a secret key, wherein the secret key comprises a secret key [d] based on an elliptic curve defined by Q=[d]P where Q and P are two points on the elliptic curve and [d] is an integer;
wherein the fault attack logic is to hide any correlation between processor behavior and secret bits in the secret key by performing register write operations for updating registers for $Q_0$ and $Q_1$ concurrently, on a common clock edge to restore both PA and PD results.

2. The processor as in claim 1 wherein hiding comprises operations of:
performing a plurality of point addition (PA) operations adding multiple values for Q where Q=[d]P and Q and P are two points on an elliptic curve and d is the secret key.

3. The processor as in claim 2 wherein the PA operations comprise $Q_{-dj}=Q_0+Q_1$, where $d_j$ comprises a secret bit of the secret key and $-d_j$ comprises an inverse of $d_j$.

4. The processor as in claim 2 wherein hiding further comprises operations of:
performing a point doubling (PD) operation by multiplying multiple values for Q.

5. The processor as in claim 4 wherein the PD operation comprises $Q_{dj}=2Q_{dj}$ where $d_j$ comprises a secret bit of the secret key.

6. A method comprising:
executing instructions and processing data on a processor having one or more cores; and
detecting that a fault is injected into the processor; and
ensuring that the execution of the instructions and processing of the data is not vulnerable to memory safe-error attacks by hiding any correlation between processor behavior and secret bits in a secret key, wherein the secret key comprises a secret key [d] based on an elliptic curve defined by Q=[d]P where Q and P are two points on the elliptic curve and [d] is an integer;
wherein the fault attack logic is to hide any correlation between processor behavior and secret bits in the secret key by performing register write operations for updating registers for $Q_0$ and $Q_1$ concurrently, on a common clock edge to restore both PA and PD results.

7. The method as in claim 6 wherein hiding comprises:
performing a plurality of point addition (PA) operations adding multiple values for Q where Q=[d]P and Q and P are two points on an elliptic curve and d is the secret key.

8. The method as in claim 7 wherein the PA operations comprise $Q_{-dj}=Q_0+Q_1$, where $d_j$ comprises a secret bit of the secret key and $-d_j$ comprises an inverse of $d_j$.

9. The method as in claim 7 wherein hiding further comprises:
performing point doubling (PD) operation by multiplying multiple values for Q.

10. The method as in claim 9 wherein the PD operation comprises $Q_{dj}=2Q_{dj}$ where $d_j$ comprises a secret bit of the secret key.

11. The method as in claim 6 wherein the secret key comprises a secret key based on an elliptic curve defined by Q=[d]P where Q and P are two points on an elliptic curve and d is an integer.

12. A system comprising:
a memory subsystem comprising a cache hierarchy and a system memory to store instructions and data;
one or more cores to execute the instructions and process data; and fault attack logic to ensure that the execution of the instructions and processing of the data is not vulnerable to memory safe-error attacks by hiding any correlation between processor behavior and secret bits in a secret key, wherein the secret key comprises a secret key [d] based on an elliptic curve defined by Q=[d]P where Q and P are two points on the elliptic curve and [d] is an integer;
wherein the fault attack logic is to hide any correlation between processor behavior and secret bits in the secret key by performing register write operations for updating registers for $Q_0$ and $Q_1$ concurrently, on a common clock edge to restore both PA and PD results.

13. The system as in claim 12 wherein hiding comprises operations of:
performing a plurality of point addition (PA) operations adding multiple values for Q where Q=[d]P and Q and P are two points on an elliptic curve and d is the secret key.

14. The system as in claim 13 wherein the PA operations comprise $Q_{-dj}=Q_0+Q_1$, where $d_j$ comprises a secret bit of the secret key and $-d_j$ comprises an inverse of $d_j$.

15. The system as in claim 13 wherein hiding further comprises the operations of:
  performing point doubling (PD) operation by multiplying multiple values for Q.

* * * * *